Nov. 6, 1956 R. H. RINES 2,769,966

SOUND SYSTEM

Original Filed Oct. 29, 1945

4 Sheets-Sheet 1

INVENTOR.
Robert H. Rines

INVENTOR.
Robert H. Rines

Nov. 6, 1956 R. H. RINES 2,769,966

SOUND SYSTEM

Original Filed Oct. 29, 1945

4 Sheets-Sheet 3

INVENTOR.
Robert H. Rines.

Nov. 6, 1956 R. H. RINES 2,769,966

SOUND SYSTEM

Original Filed Oct. 29, 1945 4 Sheets-Sheet 4

INVENTOR.
Robert H. Rines 2,769,966

SOUND SYSTEM

Robert H. Rines, Brookline, Mass.

Original application October 29, 1945, Serial No. 625,162. Divided and this application July 24, 1947, Serial No. 763,390

9 Claims. (Cl. 340—3)

The present invention relates to electric methods and systems, and more particularly to methods and systems for controlling the explosion of projectile explosives. The present application is filed in response to a requirement for division in application, Serial Number 625,162, filed October 29, 1945.

An object of the invention is to provide a new and improved sound, ultrasound or ultrasonic-energy-locator-and-tracking system.

A further object is to provide a novel sound, ultrasound or ultrasonic-controlled firing system.

The term "sound" will be employed hereinafter, in the specification and the claims, to include not only the audible part of the sound spectrum, but also, and more particularly the ultra- or supersonic spectrum, and to include also all kinds of elastic vibrations.

A further object is to provide for controlling the explosion of an "ashcan" or other projectile explosive from a point distant from the position of the projectile in motion.

According to present-day techniques, after a projectile, such as a depth-charge or an "ashcan," has been dropped along a predetermined path from a ship or an aircraft, so as to move through the water towards a submerged target object, such as a submarine, the time of its explosion is controlled at the projectile itself. The explosion may, for example, be under the control of a time fuse, a powdertrain fuse, or a magnetic-field detector mechanism. The control is such as to assure the explosion of the projectile at the moment of its approach toward the underwater object. If a time fuse or a powder fuse be employed, the target object is detected, its present position is plotted, its future position is predicted, and the time mechanism or exploding mechanism in the fuse is set accordingly before firing. In the case of a magnetic-field indicator fuse, the explosion of the projectile is effected by the mere fact of its proximity to the target object, and no further control from the firing point is necessary. All these prior-art methods are subject to the disadvantage that the projectile may explode at a time or a place where it will not harm the enemy and may, in fact, damage a friend. At the very least, a premature or a too-late or otherwise useless projectile explosion may serve to inform an enemy submarine that it is under fire.

Another object of the present invention, therefore, is to explode only those projectiles that are sufficiently near to the submarine or other enemy object to produce lethal effects.

Still another object is to prevent the explosion of projectiles that have traveled beyond, or have otherwise missed, their mark.

A further object still is to provide for exploding the projectile accurately, at any desired time during its motion, from the point of its firing, or from any other position remote from the projectile.

Other and further objects will be explained hereinafter, and will be particularly pointed out in the appended claims.

Figure 1:
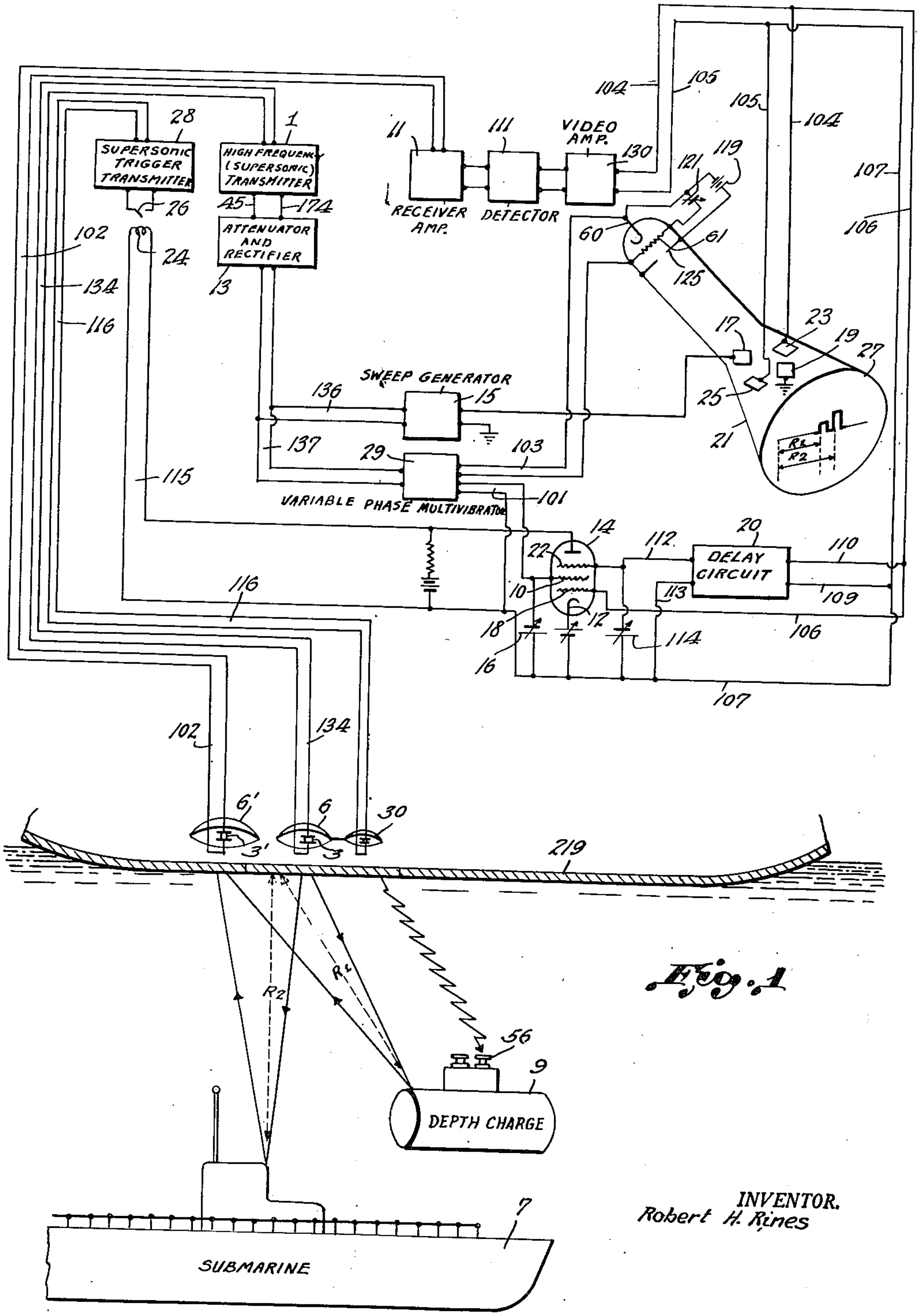
Figure 2:
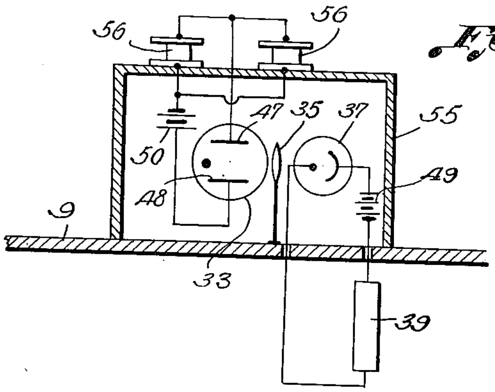
Figures 3, 4, 5, 6, 7, 8:
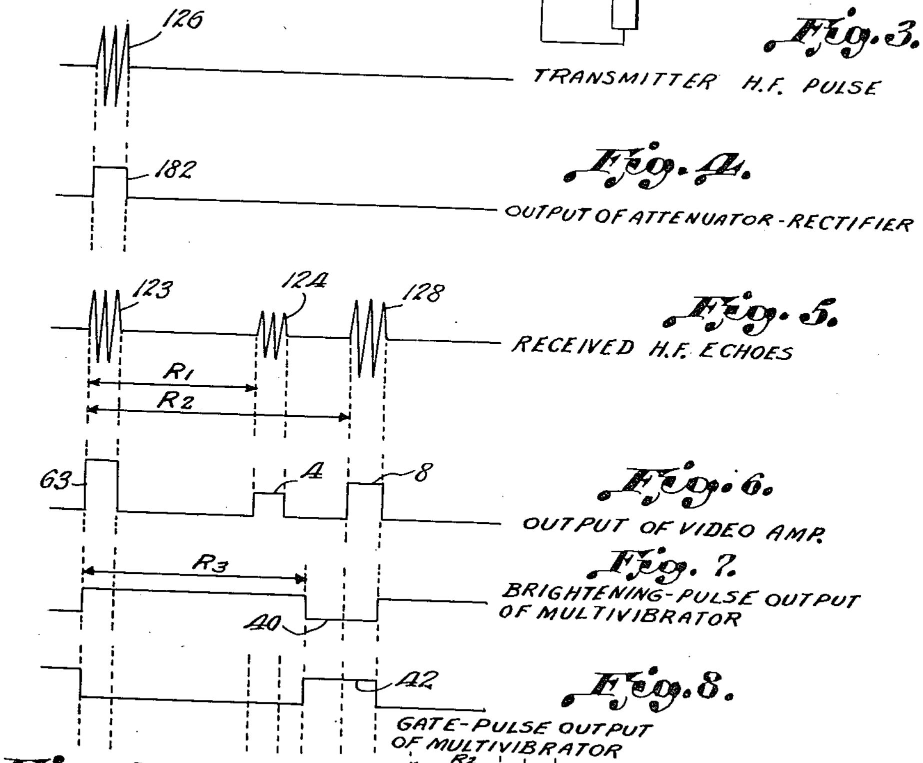
Figure 14:
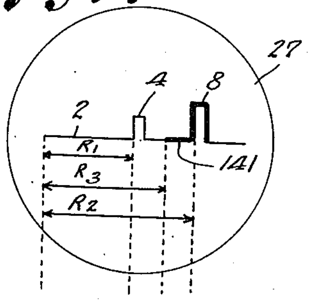
Figure 15:
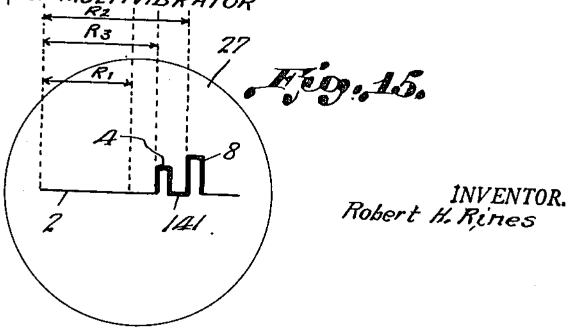
Figure 19:
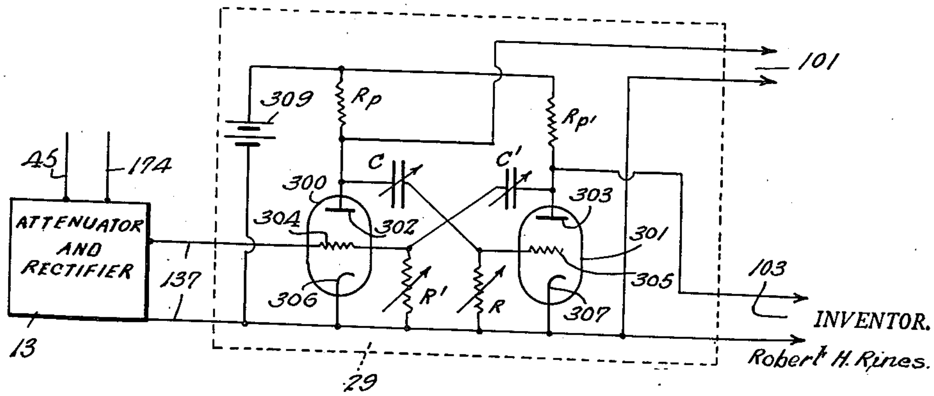
Figure 16:
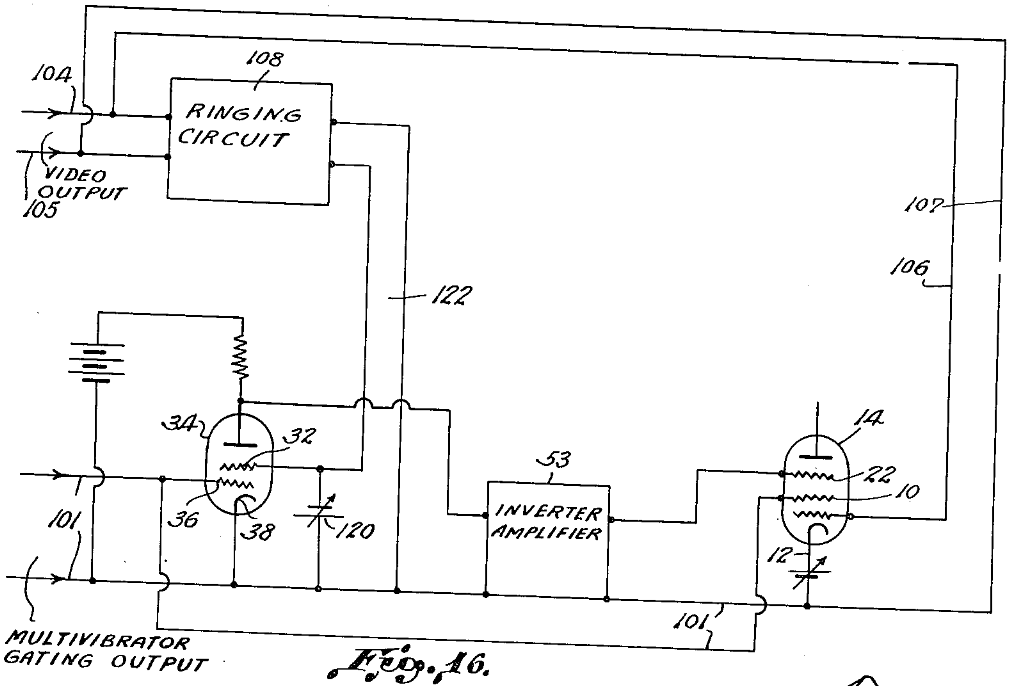
Figures 17, 18:
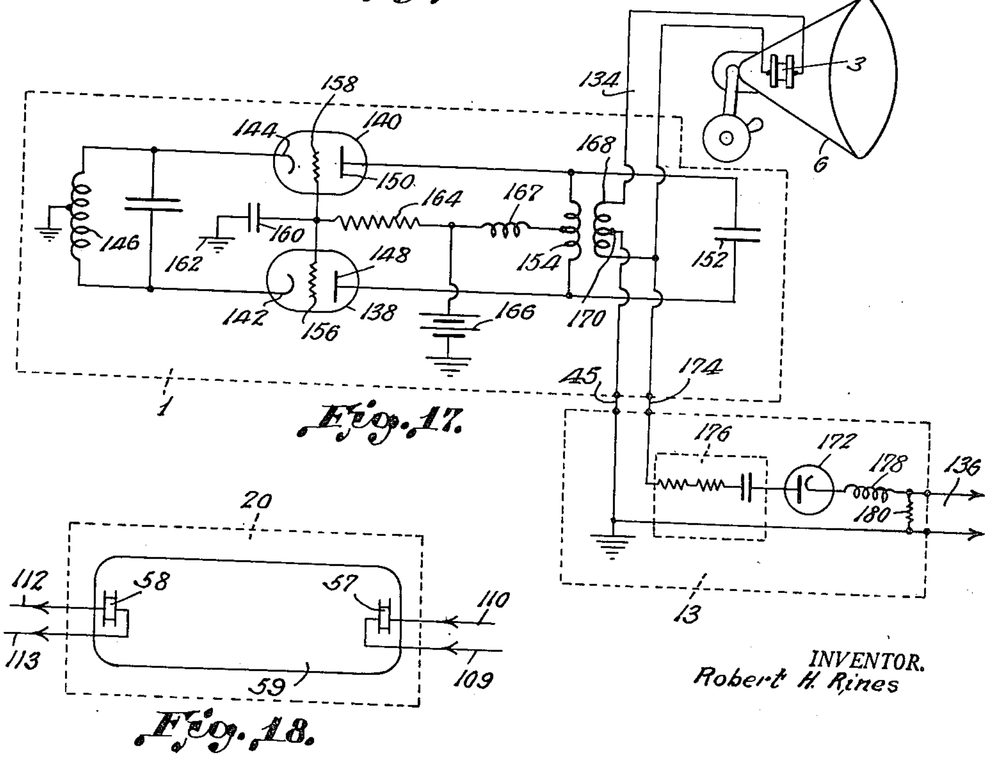

The invention will now be more fully explained in connection with the accompanying drawings, in which Fig. 1 is a diagrammatic view of circuits and apparatus arranged and constructed according to a preferred embodiment thereof; Fig. 2 is a diagrammatic view showing a sound, ultrasound or ultrasonic-energy-receiving fuse provided in the projectile, and operable in conjunction with the circuits of Fig. 1 to cause the projectile to explode; Figs. 3 to 13, inclusive, represent idealized voltage-wave forms illustrating the operation of the various components of the disclosed circuits, Fig. 3 illustrating the transmitted sound, ultrasound or ultrasonic-energy pulses, Fig. 4 the output of the attenuator-rectifier, Fig. 5 the output of the receiver, Fig. 6 the output of the video stages, Fig. 7 the brightening-pulse output of the multivibrator, Fig. 8 the gate-pulse output of the multivibrator, Fig. 9 the output of the video amplifier at an instant after that corresponding to Fig. 6, Fig. 10 the output of the delay circuit, Fig. 11 the sweep voltage produced between the horizontally-spaced vertically-disposed deflector plates of the cathode-ray-tube, Fig. 12 the sound, ultrasound or ultrasonic trigger pulse, and Fig. 13 the output of the ringing circuit; Figs. 14 and 15 are views of the cathode-ray-tube display, illustrating the sweep, the echoes and other features; Fig. 16 is a diagrammatic view of circuits and apparatus for providing a modified method of operation, to provide for firing any projectile at any position within the lethal range, or at any time when the projectile occupies such position; Fig. 17 is a diagrammatic view illustrating a preferred type of high-frequency transmitter; Fig. 18 is a similar view of a delay line, such as may be embodied in the system of Fig. 1; and Fig. 19 is a diagrammatic view illustrating a preferred type of variable-phase multivibrator.

Any well-known sound, ultrasound or ultrasonic-energy pulse transmitter 1 and receiver amplifier 11, such as are described, for example, in United States Letters Patent 2,084,845, issued June 22, 1937, to Edward L. Holmes, may be used. Ultrasonic pulse transmitters and receivers of the magnetostrictive or the piezoelectric type are preferred, such as are discussed, for example, on pages 194 to 199 of Ultrasonics by Bergmann, Bell and Sons Ltd., London, 1938.

A preferred type of high-frequency pulsed oscillator or transmitter 1 for energizing a supersonic projector to produce pulses of ultrasound waves is illustrated in Fig. 17. Two transmitting triodes 138 and 140 are connected in parallel with their cathodes 142 and 144 connected together through a grounded tuned high-frequency circuit 146. This tuned circuit may assume any desired form, such as a Lecher line or a tuned cavity (not shown). The anodes 148 and 150 of the tubes 138 and 140 are shown connected together through a tuned circuit comprising a condenser 152 and a coil 154, connected in parallel. The control-grid electrodes 156 and 158 of the tubes 138 and 140 are connected together, through a condenser 160, to a ground 162; and also, through a resistor 164, to a grounded plate-supply battery 166. As the condenser 160 is thus connected in parallel to the resistor 164 and the battery 166, connected in series, a discharge path for the condenser 160 is provided through the resistor 164 and the battery 166. A high-frequency-choke coil 167 is connected from preferably the mid-point of the plate coil 154 to the junction of the resistor 164 and the plate-supply battery 166, for the purpose of keeping high frequency out of the supply.

In operation, some disturbance starts the tubes 138 and 140 oscillating. The grids 156 and 158 draw electrons from their respective cathodes 142 and 144 to charge the condenser 160 negatively, thereby to stop conduction through the tubes, whereupon the oscillations cease. The condenser 160 thereupon discharges through the resistor 164 and the plate battery 166. When sufficient negative charge has leaked off the condenser 160, or, from another point of view, when the condenser 160 has become charged sufficiently positive through the resistor 164 and the plate supply 166, the oscillations recommence. The oscillating pulses 126 (Fig. 3), of duration, for example, of a millisecond, then produced in the coil 154, are picked up by a coil 168 to energize a resonant-cut piezoelectric crystal, as of tourmaline or quartz 3 by way of conductors 134, respectively connected to the terminals of the coil 168.

The high-frequency energy picked up by the coil 168 of the pulse transmitter 1, therefore, travels by way of the conductors 134, to the resonant piezoelectric vibrator 3, which interconverts the pulses of electrical oscillations into transmitted ultrasonic energy pulses 126, of the same frequency.

The piezoelectric crystal 3 is illustrated in Fig. 1 as positioned at the focus of a parabolic or other directive reflector 6 which may be rotated in any desired direction. The parabolic reflector 6 will then direct the ultrasonic energy out towards a target object, such as a submarine 7, and toward a depth-charge or other projectile object 9 that has been fired from a ship 219.

Upon reaching the objects 7 and 9, the ultrasonic pulses thus propagated towards these objects will become scattered and reflected back toward a parabolic reflector 6' and a receiving piezoelectric element 3', to be transmitted, by the conductors 102, to the high-frequency-receiver amplifier 11. Since pulsed energy is employed, the reflector 6' and element 3' may, if desired, be the same directive transmitting reflector 6 and element 3. The ultrasound waves are reconverted by the piezoelectric element 3 or 3' into high-frequency electric oscillations which are amplified in the amplifier 11. The received high-frequency projectile and target echoes are represented by Fig. 5 as a brief series of high-frequency oscillations 124 and 128, respectively, between similarly indicated received pulses 123 picked up directly from the oscillatory transmitted pulses 126 (Fig. 3). The amplifier 11 receives and amplifies the electrical oscillations created by the piezoelectric element 3' in response to these reflected and scattered ultrasound echoes. The energy received by the amplifier 11 may then be detected in a detector 111 to produce direct-current pulses, and then amplified in a video amplifier 130, in well-known television fashion. Suitable apparatus for performing this function may be found described, for example, on page 749 of "Radio Engineering," by F. E. Terman, 1937 edition. Any well-known superheterodyne system may also be used as a receiver.

The high-frequency ultrasound-locator transmitter 1, as shown diagrammatically in Fig. 1, is connected by conductors 45 and 174 to an attenuator-and-rectifier 13, the details of which may be as illustrated in Fig. 17. A center tap 170 of the coil 168 is there shown connected to the grounded side of the attenuator 176 by the conductor 45, shown grounded. The other side of the attenuator 176 is shown connected by the conductor 174 to one of the terminals of the coil 168. The said one terminal of the coil 168 is shown connected to one side of a rectifier 172 through one side of the attenuator 176. The other side of the rectifier 172 is shown connected, through a high-frequency-choke coil 178, to the non-grounded output conductor 136, and a load resistor 180 is connected across the output conductors 136.

The high-frequency energy picked up by the coil 168, therefore, travels not only by way of the conductors 134 to energize the piezoelectric element 3, but also, by way of the conductors 45 and 174, to the attenuator-and-rectifier 13. After passing through the attenuator 176 and the rectifier 172, and through the high-frequency choke 178, this energy appears as direct-current pulses across the resistor 180. The pulse 182 (Fig. 4) represents that part of the high-frequency-energy pulse that is attenuated and rectified in the attenuator-and-rectifier 13. The pulse 182 will obviously take place at the same instant that the pulse transmitter 1 energizes the piezoelectric element 3 to interconvert the high-frequency oscillations into elastic vibrations and to emit the ultrasound pulse 126, and it is used to trigger the sweep generator 15.

The attenuator-and-rectifier 13 is connected to a horizontal-sweep-generator circuit 15 by conductors 136, shown in Fig. 17 connected across the terminals of the resistor 180. The generator 15 may, for example, be of any conventional linear or non-linear type, such, for example, as is illustrated on page 740 of the said "Radio Engineering," by Terman. This produces a linear or non-linear horizontal-sweep time base between the horizontally spaced, vertically disposed deflector plates 17 and 19 of a cathode-ray oscilloscope 21 for deflecting the electron stream horizontally. The saw-tooth-sweep voltage thus produced between the plates 17 and 19 is represented at 62 by Fig. 11. The plate 19 is shown grounded. The video circuits 130 are shown connected to the vertically spaced horizontally disposed deflector plates 23, 25 by conductors 104 and 105, respectively.

Figure 11:
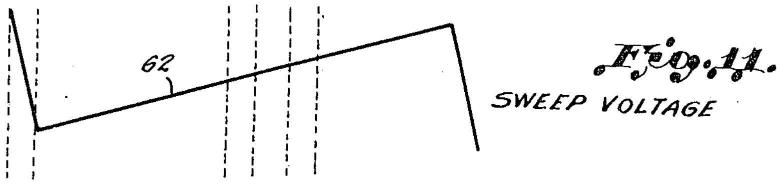

The same trigger voltage from the attenuator-and-rectifier 13 that triggers the horizontal-sweep generator 15 may trigger also a variable-phase oscillator or strobe-generator, such as a multivibrator 29, to produce pulse outputs in any desired phase relationship to the start of the sweep 62 (Fig. 11). This may be effected by connecting the attenuator-and-rectifier 13 to the multivibrator 29 by conductors 137.

The variable-phase multivibrator 29 may, for example, be of the type shown in Fig. 19, where tubes 300 and 301 are shown respectively provided with cathodes 306 and 307, control-grid electrodes 304 and 305, anode plates 302 and 303, and plate-load resistors $R_p$ and $R_p'$. A variable coupling condenser C and a variable resistor R are connected in series to constitute a coupling circuit C–R from the plate circuit of the tube 300 to the grid or input circuit of the tube 301, the grid 305 of the tube 301 being connected to the junction between the coupling condenser C and the resistor R. The grid 304 of the tube 300 is similarly connected to the junction between the variable coupling condenser C' and the variable resistor R', coupling the output circuit of the tube 301 to the input circuit of the tube 300. The condenser C may be charged from a battery 309 through the resistor R and the plate resistor $R_p$. The condenser C' may be similarly charged from the battery 309 through the resistor R' and the plate resistor $R_p'$.

Let it be assumed that the tube 300 is just cut off. A positive trigger pulse 182 (Fig. 4) is applied to the grid 304 of the tube 300, causing the tube to burst into conduction. The voltage at the plate 302 of the tube 300 drops, and the voltage at the grid 305 of the tube 301 drops also, since it is coupled to the plate 302 by the condenser C. The tube 301, therefore, cuts off, because of the negative voltage on the grid 305. The voltage of the plate 303 of the tube 301 rises, and causes the grid 304 of the tube 300 to rise further, thus increasing the conduction of the tube 300. When no further voltage change occurs at the plate 302, the condenser C becomes charged positively through the resistors R and $R_p$ from the plate-supply battery 309, until the voltage of the grid 305 rises enough, depending upon the values of C and R, to cause the tube 301 to conduct and cut off the tube 300. This point is reached at the leading or left-hand edge of the pulse 40, Fig. 7. When no further changes in voltage occur at the plate 303, the condenser C' charges through the resistor R', the supply battery 309, and the plate load $R_p'$, to restore the grid 304 of the tube 300 to its initial near cut-off condition. The circuit then remains with the tube 301 partially conducting until the next trigger pulse 182 causes the tube 300 heavily to conduct again. The time that the process of restoring the grid 304 to its initial condition consumes is determined by the settings of the condenser C′ and the resistor R′, and it is this phenomenon that produces the desired multivibrator-pulse outputs. While the waveform 40 is illustrated as a rectangular pulse, this is, of course, idealized; being, in actual practice, an exponentially dipping spike, as is well known.

A negative pulse 40, Fig. 7, thus appears at the plate 303 and a positive pulse 42, Fig. 8, at the plate 302 of the tube 300. The width of these pulses is controllable, as above explained, by the condenser-resistor control C′—R′. The time at which these pulses occur, selected and controlled, as above explained, by the phase control C—R, is shown in Fig. 7 as occurring at any desired distance $R_3$ along the sweep.

The pulse 40 (Fig. 7) is fed by conductors 103 between the cathode 60 and the control-grid electrode 61 of the cathode-ray oscilloscope 21. Normally, the electrode 61 is biased negatively with respect to the cathode 60 by, say, a battery 121, to allow a certain intensity of the electron stream to reach the oscilloscope face 27. A B-battery 119 constitutes a source of supply between the cathode 60 and the anode 125.

When the brightening pulses 40 arrive between the grid 61 and the cathode 60, the cathode 60 is rendered negative with respect to the grid 61, whereupon the electrons emitted from the cathode 60 are permitted to be accelerated, in the form of an increased stream, past the control grid 61 and the anode 125 of the oscilloscope 21, to impinge finally on the persistent fluorescent oscilloscope face 27, brightening that part of the sweep starting with a point corresponding to the distance $R_3$ from the start of the sweep, and brightening a predetermined portion of the sweep of length corresponding to the width of the pulse 40.

After rectification, and preferably also amplification, in the detector-and-video amplifier stages 111 and 130, the received direct pulses appear as shown at 63, and the echoes from the depth-charge 9 and the submarine 7 as shown at 4 and 8, respectively, in Fig. 6. The detected and amplified video signals are represented by Fig. 6 as they appear at the instant that they are applied to the vertically spaced horizontally disposed deflector plates 23 and 25 to deflect the sweep vertically, as shown in Figs. 14 and 15. The deflection 4, representing the echo from the depth-charge 9, and the deflection 8, representing the echo from the submarine target 7, are shown in Figs. 14 and 15, together with the sweep 2. In these two Figs. 14 and 15, the brightening pulse 40 of Fig. 7 is shown brightening the part 141 of the sweep associated with the echo 8.

A horizontal-sweep time base 2, the time constant of which depends on the range to be covered, is thus produced on the fluorescent screen 27 of the cathode-ray tube 21, with vertical deflections corresponding, in distance from the start of the time base, to the distances from the element 3 of the objects 7 and 9 from which the ultrasound waves are reflected or scattered. In accordance with well known echo-location technique, the echo of the depth-charge 9 will be shown at a range $R_1$ from the station and that of the object 7 at a range $R_2$.

Since the control electrode 61 is biased negatively with respect to the cathode 60, however, this horizontal sweep will not be very bright on the oscilloscope face 27. At such times as the brightening pulse 40 is applied to the cathode 60 and the grid 61, by way of the conductors 103, from the multivibrator 29, the cathode 60 becomes negative with respect to the control-grid electrode 61. The effect of the said pulse, therefore, as previously described, is to brighten the sweep during the duration of the pulse 40.

When an operator has detected a target appearing as a deflection 8 (Figs. 14 and 15), he may adjust the variable-phase multivibrator 29 to bring the edge of the brightening section on to the deflection 8, leaving, therefore, a selected predetermined portion of the sweep brightened before the deflection 8, as shown at 141. The left-hand edge of the portion 141 represents a future position of the projectile which is traveling towards the target. By suitable design of the time constants of the multivibrator 29, this brightened portion 141 may be made to correspond in width or range to the lethal distance or range of the projectile. As previously explained, the constants C′—R′ of Fig. 19 control the width of the pulse 40 and, therefore, the width of the brightened section 141. If the lethal area of the projectile is 170 yards, for example, the product of the values of the capacitance C′ and the resistance R′ may be adjusted to produce a time constant of approximately one tenth of a second. As shown in Figs. 6 and 14, the echo 4 from the object 9 has not yet reached its selected future position and has not yet entered the lethal area, shown as the horizontal region 141. Any explosion of the projectile would therefore be ineffective at this time.

Figure 9:
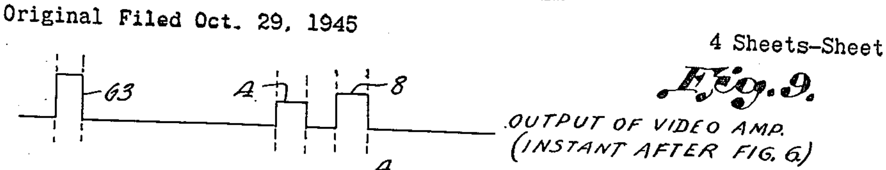

The instant that the projectile enters within the lethal distance or range, its echo will enter the brightened section 141, as shown by Figs. 9 and 15. The projectile should be exploded at this time. The method of exploding the projectile at such a time will now be explained.

The gate-pulse output 42 of the multivibrator 29, as shown in Fig. 8, taken, for example, from the plate circuit of the first tube 300 of the multivibrator by the conductors 101, may be fed between the screen grid 10 and the cathode 12 of a gating tube 14. Because of the properties of multivibrators, as previously explained, the timing and the pulse width of the output 42 will be identical with the timing and the pulse width of the output 40, taken from the second tube 301 of the multivibrator, though the pulse 42 is positive as compared with the negative pulse 40. The screen grid 10 may be biased by the battery 16, so as to prevent the tube 14 from conducting except during the application of the positive variable-phase gating pulse 42.

The video output of the receiver, as shown in Fig. 6, may be fed by the conductors 104, 106 and 105, 107 between the control electrode 18 and the cathode 12 of the gating tube 14 to cause the tube 14 to tend to conduct only during the application of the video pulses, such as the pulses 4 and 8. The same video output shown in Fig. 6 may be fed by the conductors 104, 106, 110 and 105, 107, 109 to a delay circuit 20 of any convenient and well-known type, such as an artificial transmission line, a time-constant circuit, or an ultrasonic cell 59, Fig. 18. From the delay circuit, the video output is fed, by conductors 112 and 113 (Fig. 1), between a suppressor electrode 22 and the cathode 12 of the gating tube 14. The suppressor electrode 22 is shown negatively biased by a battery 114. The delay mechanism 20 should be adjusted to delay any video signals by an amount of time corresponding to the pulse width of the gating pulse 42, that is, to the lethal range of the burst of the projectile 9. For example, an ultrasonic cell 59 may be used, as shown in Fig. 18, of material and length such that the video signals, fed to an exciter at one end, such as a piezo-electric crystal 57, and propagated through the cell 59, shall be delayed by a length of time corresponding to the pulse width of the pulse 42, and then sent to the suppressor electrode 22 by a receiver piezo-electric crystal 58 at the other end of the cell 59. The echo 4 from the projectile 9 and the echo 8 from the object 7, as shown in Fig. 10, will therefore arrive at the suppressor electrode 22 of the gating tube 14 after a period of time displaced from their respective positions in Fig. 9 by approximately the duration of the variable-phase pulse output 40 or 42.

Figure 10:
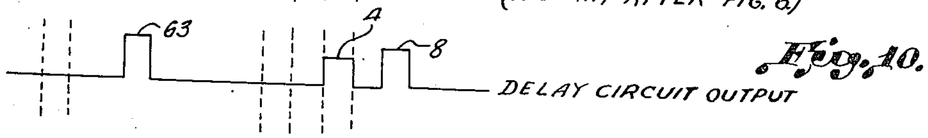

In Fig. 10, for illustrative purposes, the echo 4 from the depth-charge 9 is indicated as arriving at the suppressor grid 22 at the same time that the echo 8 from the object 7, as shown in Fig. 9, arrives at the control grid 18 of the gating tube 14, and also during the continued application of the gating pulse 42 from the multivibrator, as shown in Fig. 8, at the screen grid 10 of the gating tube 14.

Figure 12:
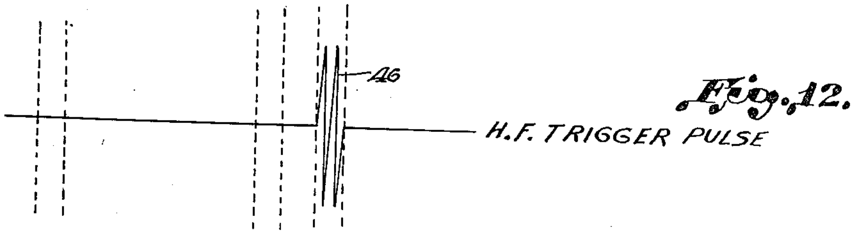

At approximately the instant of time that the depth-charge shell 9 enters the lethal area, therefore, the gating tube 14 is opened up by the application of the gating pulse 42 to the screen grid 10, the object pulse 8 to the control grid 18, and the delayed pulse 4 to the suppressor grid 22. The actual instant is somewhat later, after a time corresponding approximately to the width of the variable-phase pulse 40 or 42. At that instant of time, the gating tube 14 conducts heavily, thus causing less current to flow through a relay coil 24 (Fig. 1) that is connected, by conductors 115, in parallel with the plate or output circuit of the gating tube 14. This diminution of current through the relay coil 24 results in the closing of a relay switch 26, disposed in the plate or output supply of a high-frequency trigger transmitter 28. The transmitter 28 is connected, by conductors 116, to energize a further pizeo-electric vibrator system 30, shown as a directional system moving together or in synchronism with the reflector 6. The system 30, which is normally ineffective to transmit a signal, will thus be rendered effective to send a further and special directional ultrasound signal 46, of a different frequency, for example, than the frequency of the transmitter 1, as illustrated by Fig. 12, toward the projectile 9, to explode the projectile.

A receiving-mechanism fuse provided in the projectile 9 will therefore cause the projectile 9 to explode almost immediately, the velocity of elastic vibrations in water being about 4500 feet per second. This receiving mechanism may comprise a receiving piezo-electric element or elements, of cut resonant to the frequency of the trigger transmitter 28, two of which are shown at 56, preferably mounted externally to the fuse mechanism 55, as shown in Fig. 2. The piezo-electric elements interconvert the ultrasound waves to high-frequency electric oscillations which are fed into the fuse to energize a light-transparent high-frequency cavity resonator 33 of dimensions resonant to the electric oscillations corresponding to the oscillations transmitted by the trigger transmitter 28 (Fig. 1). The high-frequency resonant cavity 33 may, for example, be constituted of polystyrene or any other similar light-transparent material that serves as a conductor at high electrical frequencies. The resonator may be filled with an illuminating agent; for example, a rare gas, such as neon or argon.

The elements 56 are shown connected to the resonant cavity 33 between discharge electrodes 47 and 48. The electric energy thus fed into the gas in the cavity resonator 33 results in ionizing the gas therein, which therefore becomes illuminated. The illumination may be focused by a lens 35 upon a photocell 37, connected in series with a battery 49 and an igniting mechanism 39, such as a charge.

When the trigger transmitter 28 energizes the cavity 33, therefore, the light from the ionization of the cavity resonator gas causes current to flow in the light-sensitive circuit of the photocell 37, upon which the light is focused, thereby causing a sufficiently large current to flow through the charge 39 to ignite the charge 39 and to explode the depth-charge.

If desired, the light-transparent high-frequency cavity resonator 33 may be maintained periodically ionized by a striking potential from an energy source 50, which charges and discharges the capacitance of the piezo-electric elements through the gas, as shown in Fig. 2. The current produced in the photocell circuit is adjusted so that it is not enough to ignite the charge 39. When the high-frequency energy from the trigger transmitter 28 is conveyed into the cavity resonator, the gas will become further ionized, producing an increased intensity of light discharge and a greater current in the photocell circuit for setting off the mechanism 39.

It may be desired to insure that the depth-charge 9 shall fire at any given time after it shall get within lethal range, or when it occupies any desired position within the lethal range. Such an occasion may arise, for example, in the event that the sound-locator system 3, 6 should happen not to pick up the signal from the depth-charge 9 or the target 7 until after the depth-charge shall have already entered the lethal area.

Figure 13:
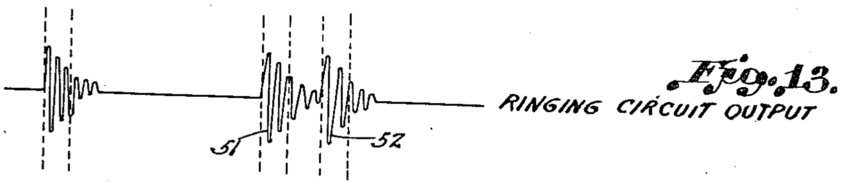

To the attainment of this end, the video output of the receiver may also be fed by conductors 104, 105 to a ringing or a poorly damped high-frequency oscillating circuit 108, as shown in Fig. 16. Each video signal, therefore, will produce a train of oscillations, the half-period of which will be much less than the width of the pulses of the high-frequency transmitter 1. As shown in Fig. 13, whole trains of positive and negative oscillations may thus be produced by each video pulse, a train 51 corresponding to the echo 4, as shown in Fig. 9, and a train 52 corresponding to the echo 8. These trains of oscillations may be fed by conductors 122 (Fig. 16) between the screen grid 32 and the cathode 38 of another gating tube 34, in order to lift the bias thereon provided by, say, a biasing battery 120.

The variable-phase gating pulse output 42 of the multivibrator 29 may also be fed by the conductors 101, not only between the screen grid 10 and the cathode 12 of the first gating tube 14, as previously described, but also between the control electrode 36 and the cathode 38 of the second gating tube 34, as shown in Fig. 16. This may be effected simultaneously with the application of the trains of oscillations 51 and 52 to the screen grid 32. The tube 34 will therefore open up to conduct each positive oscillation for the duration of the gating pulse 42. The output of the tube 34 may be inverted in any well-known video amplifier 53, so that a series of closely spaced positive pulses shall be available for application to the suppressor grid 22 of the main gating tube 14. The delay circuit 20, of course, will be disconnected from the suppressor grid 22 during this mode of operation.

Since the half-period of the oscillations 51, 52 is small compared with the width of the video signals 4 and 8, the main gating tube 14 will open up on the application of a video signal 4 from a projectile 9 at essentially any time during the gating period of the output 42 and, therefore, at essentially any time after the projectile 9 enters within the lethal area of the object 7.

Other and further modifications will occur to persons skilled in the art, and all such are considered to fall within the spirit and scope of the invention, as defined in the appended claims.

What is claimed is:

1. An electric system having, in combination, a sound locator for detecting objects one of which is provided with explodable means, voltage-producing means for continuously selecting a future position of the explodable object within a preselected range of another of the objects to be destroyed by the explodable object, and means separate from the sound locator operable at a remote point and responsive to the voltage of the selecting means and to the sound locator for automatically energizing the explodable means to explode the explodable object when it approaches within the preselected range during the continued detecting of the objects by the sound locator.

2. An electric system having, in combination, sound-locating means for detecting an object provided with explodable means, voltage-producing means for continuously selecting a future position of the explodable object, and sound-controlled means separate from the sound-locating means responsive to the voltage of the selecting means and to the sound-locating means for automatically energizing the explodable means to explode the object when it reaches the future position during the continued detecting of the object by the sound-locating means.

3. An electric system having, in combination, sound-receiving means for receiving sound waves from both a target and a projectile traveling toward the target provided with energy-receiving means, normally ineffective means for transmitting an energy signal of an entirely different character than the sound waves received by the sound-receiving means to the energy-receiving means, a display, means controlled in accordance with the sound waves received from both the target and the projectile for producing indications of the distance between the target and the projectile upon the display, voltage-producing means for continuously selecting a predetermined value of distance between the target and the projectile upon the display, and means responsive to the voltage of the selecting means and to the received sound waves and operable when the distance between the target and the projectile becomes less than the predetermined value to render the transmitting means effective to transmit the energy signal to the projectile energy-receiving means.

4. An electric system having, in combination, means for propagating pulses of sound waves towards both a target and an explodable projectile traveling toward the target provided with energy-receiving means and means connected with the receiving means for exploding the projectile in response to an energy signal received by the energy-receiving means, sound-receiving means for receiving the pulses of sound waves after reflection and scatter from the target and the projectile, normally ineffective means separate from the propagating means for transmitting an energy signal to the energy-receiving means, a cathode-ray-tube display, means synchronized with the propagating means for producing a time base upon the cathode-ray-tube display, means controlled by the sound-receiving means for indicating the instants of reception of the reflected and scattered sound waves from the target and from the projectile upon the time base, thereby to indicate the relative distances of the target and of the projectile, voltage-producing means for continuously selecting a portion of the time base corresponding to a predetermined value of distance from the target, and means responsive to the voltage of the selecting means and to the received sound waves and operable when the distance between the target and the projectile becomes less than the predetermined value to render the transmitting means effective to transmit the energy signal to the energy-receiving means, thereby to effect the explosition of the projectile during the continued propagation and reception of the sound waves.

5. An electric system having, in combination, a sound-locator system for detecting relatively movable objects one of which is provided with energy-receiving means and producing voltages indicative of the relative positions of the detected objects, means comprising a further voltage-producing selecting means for producing a further voltage correlated with respect to the said voltage indicative of another of the said objects and continuously corresponding to a selected assumed future position of the said one object within a preselected range of the said another of the objects, a normally ineffective electric circuit that can be rendered effective only upon the substantially simultaneous application thereto of the said voltages indicative of the said one and the said other objects detected by the sound-locator system and the said further voltage produced by the selecting means at the time when the said one object approaches within the said preselected range, means for feeding the said voltages produced by the sound-locator system and the said further voltage produced by the selecting means to the normally ineffective electric circuit, thereby automatically to render the electric circuit effective at the said time, and means responsive to the rendering effective of the electric circuit for thereupon transmitting an energy signal to the said energy-receiving means of the said one object.

6. An electric system having, in combination, a sound-locator system for detecting relatively movable objects one of which is provided with sound-receiving means and producing voltages indicative of the relative positions of the detected objects, means comprising a further voltage-producing selecting means for producing a further voltage correlated with respect to the said voltage indicative of another of the said objects and continuously corresponding to a selected assumed future position of the said one object within a preselected range of the said another of the objects, a normally ineffective electric circuit that can be rendered effective only upon the substantially simultaneous application thereto of the said voltages indicative of the said one and the said other objects detected by the sound-locator system and the said further voltage produced by the selecting means at the time when the said one object approaches within the said preselected range, means for feeding the said voltages produced by the sound-locator system and the said further voltage produced by the selecting means to the normally ineffective electric circuit, thereby automatically to render the electric circuit effective at the said time, and means responsive to the rendering effective of the electric circuit for thereupon transmitting a sound signal to the said sound-receiving means of the said one object.

7. An electric system having, in combination, a sound-locator system for detecting relatively movable objects one of which is explodable and producing voltages indicative of the relative positions of the detected objects, means comprising a further voltage-producing selecting means for producing a further voltage correlated with respect to the said voltage indicative of another of the said objects and continuously corresponding to a selected assumed future position of the said one object within a preselected range of the said another of the objects, a normally ineffective electric circuit that can be rendered effective only upon the substantially simultaneous application thereto of the said voltages indicative of the said one and the said other objects detected by the sound-locator system and the said further voltage produced by the selecting means at the time when the said one object approaches within the said preselected range, means for feeding the said voltages produced by the sound-locator system and the said further voltage produced by the selecting means to the normally ineffective electric circuit, thereby automatically to render the electric circuit effective at the said time, and means responsive to the rendering effective of the electric circuit for exploding the said one object.

8. An electric system having, in combination, a sound-locator system for detecting relatively movable objects one of which is provided with sound-receiving means and for producing voltages indicative of the relative positions of the detected objects, means comprising a further voltage-producing selecting means for producing a further voltage correlated with respect to the said voltage indicative of another of the said objects and continuously corresponding to a selected assumed future position of the said one object within a preselected range of the said another of the objects, means for producing voltages corresponding to but delayed from the said voltages produced by the sound-locator system an interval of time corresponding substantially to the said preselected range, a normally ineffective electric circuit that can be rendered effective only upon the substantially simultaneous application thereto of the said voltage indicative of the said other object detected by the sound-locator system, the delayed voltage indicative of the said one object and the said further voltage produced by the selecting means, means for feeding the said voltage produced by the sound-locator system, the said delayed voltage and the said further voltage produced by the selecting means to the normally ineffective electric circuit, thereby automatically to render the electric circuit effective at the time when the said one object approaches within the said preselected range, and means responsive to the rendering effective of the electric circuit for thereupon transmitting a sound signal to the said sound-receiving means of the said one object.

9. An electric system having, in combination, a sound-energy locator system provided with means for propagating pulses of sound energy toward and receiving the pulses of sound energy after reflection and scatter from relatively movable objects one of which is provided with sound-energy-receiving means and means for producing pulse voltages from the pulses of sound energy received from the objects, thereby to measure the range of the relative positions of the objects, means comprising a further voltage-producing selecting means for producing a further voltage correlated with respect to the said voltage indicative of another of the said objects and continuously corresponding to a selected assumed future position of the said one object within a preselected range of the said another of the objects, means for producing pulse voltages corresponding to but delayed from the said pulse voltages produced by the sound-energy-locator system an interval of time corresponding substantially to the said preselected range, a normally ineffective electric circuit that can be rendered effective only upon the substantially simultaneous application thereto of the said pulse voltage indicative of the said other object produced by the sound-energy-locator system, the delayed pulse voltage indicative of the said one object and the said further voltage produced by the selecting means, means for feeding the said pulse voltages produced by the sound-energy-locator system, the said delayed pulse voltage and the said further voltage produced by the selecting means to the normally ineffective electric circuit, thereby to render the electric circuit effective at the time when the said one object approaches within the said preselected range, and means responsive to the rendering effective of the electric circuit for thereupon transmitting a sound-energy signal to the said one object for reception in the said sound-energy-receiving means.

References Cited in the file of this patent

UNITED STATES PATENTS

| | | |
|---|---|---|
| 1,769,203 | Buckley | July 1, 1930 |
| 2,060,198 | Hammond | Nov. 10, 1936 |
| 2,143,035 | Smith | Jan. 10, 1939 |
| 2,361,177 | Chilowsky | Oct. 24, 1944 |
| 2,368,953 | Walsh | Feb. 6, 1945 |
| 2,403,569 | Wales | July 9, 1946 |
| 2,409,462 | Zworykin | Oct. 15, 1946 |
| 2,409,719 | Sorensen | Oct. 22, 1946 |
| 2,480,561 | Ewing | Aug. 30, 1949 |
| 2,557,949 | Deloraine | June 26, 1951 |

FOREIGN PATENTS

| | | |
|---|---|---|
| 590,489 | Great Britain | July 18, 1947 |